US007757125B2

(12) United States Patent
Bassin et al.

(10) Patent No.: US 7,757,125 B2
(45) Date of Patent: Jul. 13, 2010

(54) DEFECT RESOLUTION METHODOLOGY AND DATA DEFECTS QUALITY/RISK METRIC MODEL EXTENSION

(75) Inventors: Kathryn Allyn Bassin, Harpursville, NY (US); Clyde J. Bearss, Marietta, GA (US); Linda Marie Clough, South Windsor, CT (US); Susan Eileen Skrabanek, Talking Rock, GA (US); Crystal Faye Springer, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 11/675,871

(22) Filed: Feb. 16, 2007

(65) Prior Publication Data

US 2008/0201612 A1 Aug. 21, 2008

(51) Int. Cl.
*G06F 11/00* (2006.01)
(52) U.S. Cl. .......................... 714/38; 717/124; 702/185
(58) Field of Classification Search .................. 714/38; 717/124; 702/185
See application file for complete search history.

(56) References Cited

U.S. PATENT DOCUMENTS 6,901,535 B2 * 5/2005 Yamauchi et al. ............. 714/38
7,305,325 B2 * 12/2007 Kostyk et al. ............... 702/183
7,401,321 B2 * 7/2008 Sit et al. ..................... 717/125
7,516,438 B1 * 4/2009 Leonard et al. ............. 717/102
2006/0251073 A1 11/2006 Lepel et al.
2006/0265188 A1 11/2006 French et al.

OTHER PUBLICATIONS

Bridge et al. "Orthogonal defect classification using defect data to improve software development." Software Quality, vol. 3, 1998.*

* cited by examiner

*Primary Examiner*—Philip Guyton
(74) *Attorney, Agent, or Firm*—Patterson & Sheridan, LLP; James R. Nock (57) ABSTRACT

Methods, systems, and articles of manufacture for analyzing defects associated with a software development project. Descriptions of defects identified during the testing of a software product may be stored in a data structure. One or more of the defects may be identified as data defects. If data defects are determined to be the dominant class of defects in the data structure, the data defects may be analyzed to determine a cause for one or more data defects. For example, the focus areas affected by the defects, the trends over time of the defects, the particular types of the data defects, the stability of the system, etc. may be analyzed to determine a cause for the data defects. Therefore, corrective measures may be taken based on the identified cause of the one or more data defects.

8 Claims, 7 Drawing Sheets

Fig. 1

| FIELD | CLASSIFICATION |
|---|---|
| 210 — TARGET | DATA |
| 220 — ARTIFACT TYPE | MASTER DATA CONFIGURATION<br>VALIDITY<br>FORMAT<br>MIGRATION<br>CORRUPTION |
| 230 — ARTIFACT TYPE QUALIFIER | SEE FIGURE 3 |
| 240 — SOURCE | |
| 250 — AGE | |
| 260 — IMPACT | DATA INTEGRITY<br>SECURITY<br>RELIABILITY<br>CAPABILITY<br>REQUIREMENTS<br>MIGRATION<br>PERFORMANCE |
| 270 — BUSINESS PROCESS | |
| 280 — OPEN DATE | |
| 290 — FOCUS AREA | |

| TABLE 2: ARTIFACT TYPE TO QUALIFIER CLASSIFICATION MAPPING: | |
|---|---|
| WHEN ARTIFACT TYPE= | THEN ARTIFACT TYPE QUALIFIER OPTIONS ARE: |
| MASTER DATA CONFIGURATION | • INCORRECT<br>• MISSING<br>• CONFUSING / MISLEADING INFORMATION (PROVIDED BY CUSTOMER)<br>• CONFUSING / MISLEADING INFORMATION (PROVIDED BY COMPONENT / SYSTEM) |
| VALIDITY | • INCORRECT (FROM COMPONENT)<br>• INCORRECT (FROM CUSTOMER)<br>• INCORRECT (CREATED BY TEST)<br>• CONFUSING / MISLEADING INFORMATION (CUSTOMER)<br>• CONFUSING / MISLEADING INFORMATION (COMPONENT / SYSTEM)<br>• WITHDRAW / NOT NOTIFIED (BY CUSTOMER)<br>• WITHDRAW / NOT NOTIFIED (BY COMPONENT / SYSTEM)<br>• WITHDRAW / OVERLOOKED<br>• EXPIRED / NOT NOTIFIED (BY CUSTOMER)<br>• EXPIRED / NOT NOTIFIED (BY COMPONENT / SYSTEM)<br>• EXPIRED / OVERLOOKED |
| FORMAT | • INCORRECT (CREATED BY TEST)<br>• INCORRECT (FROM COMPONENT)<br>• INCORRECT (FROM CUSTOMER)<br>• CONFUSING / MISLEADING INFORMATION (CUSTOMER)<br>• CONFUSING / MISLEADING INFORMATION (COMPONENT / SYSTEM) |
| MIGRATION | • INCORRECT (MAPPING)<br>• MISSING (MAPPING) |
| CORRUPTION | • CORRUPTION SOURCE KNOWN / LOGIC CORRECTED (CUSTOMER)<br>• CORRUPTION SOURCE KNOWN / LOGIC CORRECTED (COMPONENT / SYSTEM)<br>• CORRUPTION SOURCE KNOWN / LOGIC CORRECTED (CREATED BY TEST)<br>• CORRUPTION SOURCE UNKNOWN (CUSTOMER)<br>• CORRUPTION SOURCE UNKNOWN (COMPONENT / SYSTEM)<br>• CORRUPTION SOURCE UNKNOWN (CREATED BY TEST) |

*Fig. 3*

| TABLE 3: CALCULATED FIELD LOGIC FOR FOCUS AREA FIELD ||
|---|---|
| FOCUS AREA: | COMPRISING OF FAILURES WITH THE FOLLOWING QUALIFIERS: |
| SKILL / TRAINING / PROCESS | • INCORRECT (CREATED BY TEST)<br>• MISSING<br>• EXPIRED / OVERLOOKED<br>• WITHDRAW / OVERLOOKED |
| COMMUNICATION | • EXPIRED / NOT NOTIFIED (BY CUSTOMER)<br>• EXPIRED / NOT NOTIFIED (BY COMPONENTS / SYSTEM)<br>• WITHDRAW / NOT NOTIFIED (BY CUSTOMER)<br>• WITHDRAW / NOT NOTIFIED (BY COMPONENT / SYSTEM)) |
| COMPONENT / SYSTEM | • CORRUPTION SOURCE KNOWN / LOGIC CORRECTED (COMPONENT / SYSTEM)<br>• CORRUPTION SOURCE UNKNOWN (COMPONENTS / SYSTEM)<br>• CONFUSING / MISLEADING INFORMATION (COMPONENT / SYSTEM) |
| CUSTOMER | • CORRUPTION SOURCE KNOWN / LOGIC CORRECTED (CUSTOMER)<br>• CORRUPTION SOURCE UNKNOWN (CUSTOMER)<br>• CONFUSING / MISLEADING INFORMATION (CUSTOMER) |

DEFECT RESOLUTION METHODOLOGY AND DATA DEFECTS QUALITY/RISK METRIC MODEL EXTENSION

CROSS-REFERENCE TO RELATED APPLICATIONS

This application is related to U.S. patent application Ser. No. 11/675,920, entitled "Defect Resolution Methodology Target Assessment Process", filed Feb. 16, 2007, by Bassin, et al. This related patent application is herein incorporated by reference in its entirety.

BACKGROUND OF THE INVENTION

1. Field of the Invention

The present invention generally relates to computer systems, and more specifically to the analysis of defects in computer software products.

2. Description of the Related Art

While software systems continue to grow in size and complexity, business demands continue to require shorter development cycles. This has led software developers to compromise on functionality, time to market, and quality of software products. Furthermore, the increased schedule pressures and limited availability of resources and skilled labor can lead to problems such as incomplete design of software products, inefficient testing, poor quality, high development and maintenance costs, and the like. This may lead to poor customer satisfaction and a loss of market share for software developers.

To improve product quality, many organizations devote an increasing share of their resources to testing and identifying problem areas related to the software and the process of software development. Accordingly, it is not unusual to include a quality assurance team in software development projects to identify defects in the software product during, and after development of a software product. By identifying and resolving defects before marketing the product to customers, software developers can assure customers of the reliability of their products, and reduce the occurrence of post-sale software fixes such as patches and upgrades which may frustrate their customers.

Software testing may involve verifying the correctness, completeness, security, quality, etc. of a product. During testing, a technical investigation may be performed by, for example, executing a program or application with the intent to find errors. If errors are found, one or more areas in the software code may be identified based on the errors. Therefore, developers may alter the code in the identified regions to obviate the error.

After a defect has been fixed, data regarding the defect, and the resolution of the defect, may be stored in a database. The defects may be analyzed as a whole using, for example, Orthogonal Defect Classification (ODC), which is well known in the prior art. ODC is a commonly used complex quality assessment schema for understanding code related defects uncovered during testing. However, defects may occur due to a wide variety of reasons, for example, data and environment related factors. Therefore, because ODC is limited to analyzing only code defects it does not provide any meaningful, multifaceted analysis of key focus areas related to software development such as risks of moving the project forward, testing effectiveness, testing efficiency, consumer satisfaction, readiness of a system for production, and the like.

Accordingly, what is needed are improved methods and systems for classifying defects and identifying problem areas in the development cycle.

SUMMARY OF THE INVENTION

The present invention generally relates to computer systems, and more specifically to the analysis of defects in a computer system.

One embodiment of the invention provides a method for analyzing defects associated with a software system. The method generally comprises identifying one or more defects during testing of a software product, wherein at least one defect is identified as a data defect, storing descriptions of the defects and resolution of the defects in a data structure, and analyzing the defects stored in the data structure to determine a cause for one or more of the defects.

Another embodiment of the invention provides a computer readable storage medium comprising a defect analysis tool which, when executed, performs operations for analyzing defects associated with software systems. The operations generally comprise accessing a data structure comprising descriptions of defects identified during testing of a software product, wherein at least one of the defects is a data defect, determining whether the defects are predominantly data defects, and if data defects dominate the defects, analyzing the data defects to determine a cause for one or more data defects.

Yet another embodiment of the invention provides a system generally comprising a defect data collection tool, a defect analysis tool, and a data structure coupled with the defect data collection tool and the defect analysis tool, wherein the data structure is configured to retain descriptions of defects identified during testing of a software system, wherein at least one of the defects is a data defect. The defect analysis tool is configured to access the data structure, determine whether data defects dominate the defects, and if data defects dominate the defects, analyze the data defects to determine a cause for one or more data defects.

A further embodiment of the invention provides a method for analyzing defects associated with a software project. The method generally comprises installing a defect data collection tool for testing the software project, the defect data collection tool being configured to store a description of at least one data defect in a data structure. The method further comprises installing a defect analysis tool, the defect analysis tool being configured to analyze the defects stored in the data structure for determining a cause for one or more of the data defects defects.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention is generally related to computer systems, and more specifically to methods, systems, and articles of manufacture for analyzing defects associated with a software development project. Descriptions of defects identified during the testing of a software product may be stored in a data structure. One or more of the defects may be identified as data defects. If data defects are determined to be the dominant class of defects in the data structure, the data defects may be analyzed to determine a cause for one or more data defects. For example, the focus areas affected by the defects, the trends over time of the defects, the particular types of the data defects, the stability of the system, etc. may be analyzed to determine a cause for the data defects. Therefore, corrective measures may be taken based on the identified cause of the one or more data defects.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the system shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Data Defect Classification

In order to analyze defects and derive meaningful data therefrom, defects may be classified, and data related to the defect and resolution of the defect may be collected and stored as the defects are encountered. As previously discussed, defects may occur due to a number of reasons including, but not limited to, erroneous code, erroneous data, erroneous environmental conditions, and the like. Therefore, when a defect is encountered it may be classified as, for example, a code defect, data defect, environment defect, etc. Further descriptions of the defect may also be included to identify a particular nature of the defect. This section illustrates exemplary classification of data related defects according to an embodiment of the invention.

Figure 1:
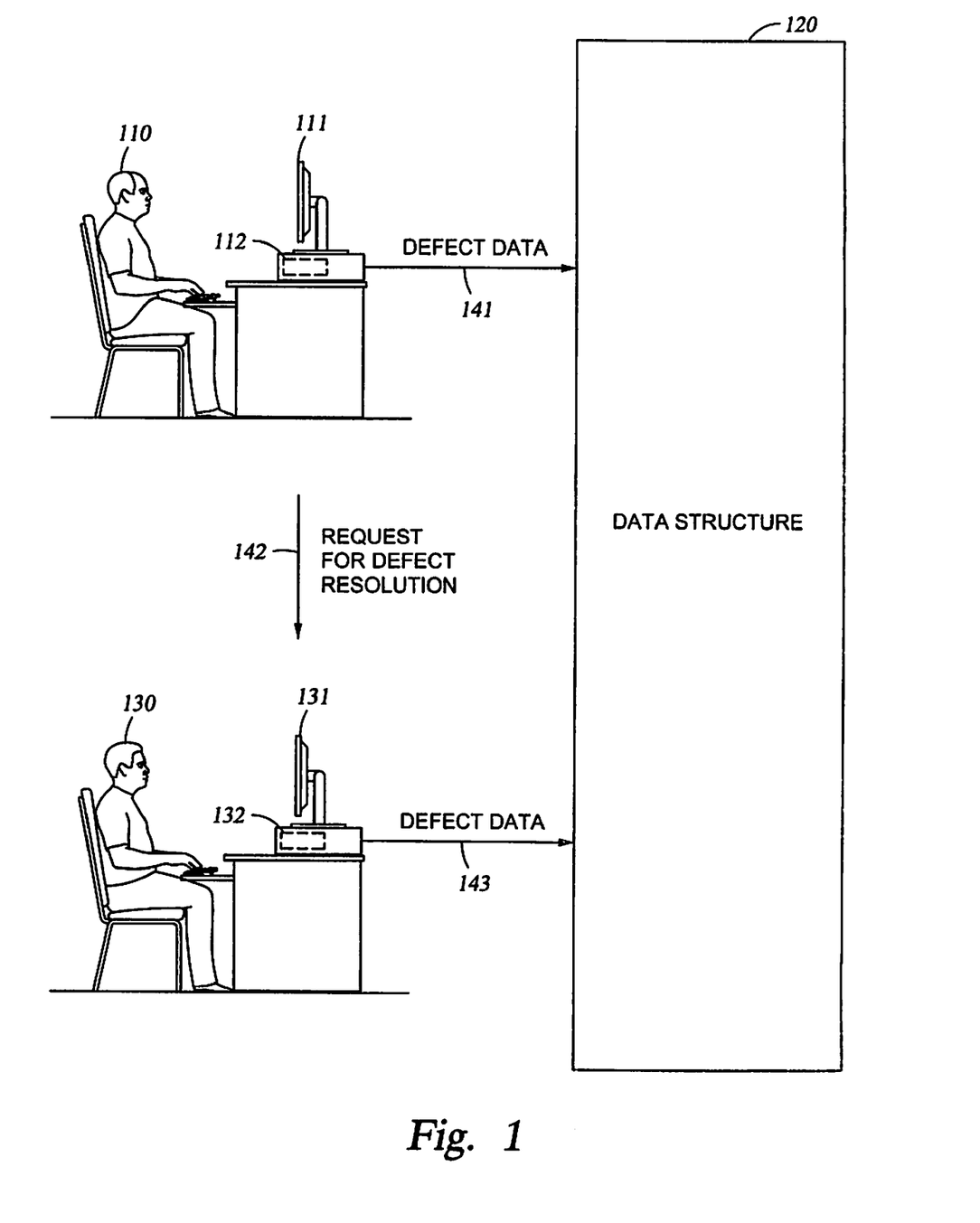
FIG. 1 illustrates an exemplary system defect data collection and analysis, according to an embodiment of the invention.

FIG. 1 is a diagram illustrating an exemplary defect identification process according to an embodiment of the invention. Defects may be identified, for example, by a tester 110 testing a software system. Tester 110 may be, for example, a quality assurance engineer trained to test software products to identity defects. In one embodiment, tester 110 may be a customer using the product. Tester 110 may execute one or more programs or applications associated with the software product on a testing machine 111 configured to test the software product. Upon identifying a defect, tester 110 may store data 141 regarding the identified defect in a data structure 120. For example, in one embodiment, tester 110 may classify the defect as a data defect and store information related to the data defect in data structure 120.

Data structure 120 may be representative of any collection of data regardless of the particular physical representation. By way of illustration, the data structure 120 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

Data structure 120 may be contained in any one of computers 111 and 131 shown in FIG. 1. In one embodiment of the invention, data structure 120 may be contained in a server. Computers 111 and 131, and a server containing database 120 may be connected to a network, for example, a Local Area Network (LAN), the internet, and the like, for exchanging defect data.

In one embodiment of the invention, tester 110 may notify a developer 130 of the software product regarding the identified defect. Tester 110 may send a request for defect resolution 142, for example, via email, to developer 130 to notify developer 130 that a defect has been identified. Developer 130 may retrieve the defect data 141 stored in data structure 120 by tester 110 and perform operations to resolve the defect. For example, developer 130 may alter code of the software product, migrate data, include one or more missing components to the software system, and the like. After a defect is resolved, developer 130 may store further data 143 regarding the defect and resolution of the defect in data structure 120.

One skilled in the art will recognize that embodiments of the invention are not limited by the particular process of identifying and resolving defects illustrated in FIG. 1. Generally, any reasonable method for identifying defects associated with a software product, resolving the defect, and storing data regarding the defect and resolution of the defect in a data structure fall within the purview of the invention. For example, in one embodiment, product testing and defect resolution may be performed by the same person, for example, developer 130.

As previously discussed, defects in software products may occur due to a wide variety of reasons. One such reason may be defects in data required for operating the software product. For example, data defects may occur due to factors such as availability, validity, corruption, etc. of data associated with the software product. When a defect emanating from data related issues is identified, the defect may be classified as a data defect and stored to data structure 120. In addition to identifying a defect as a data defect, further descriptions of the particular nature of the data defect may also be stored to data structure 120.

Figure 2:
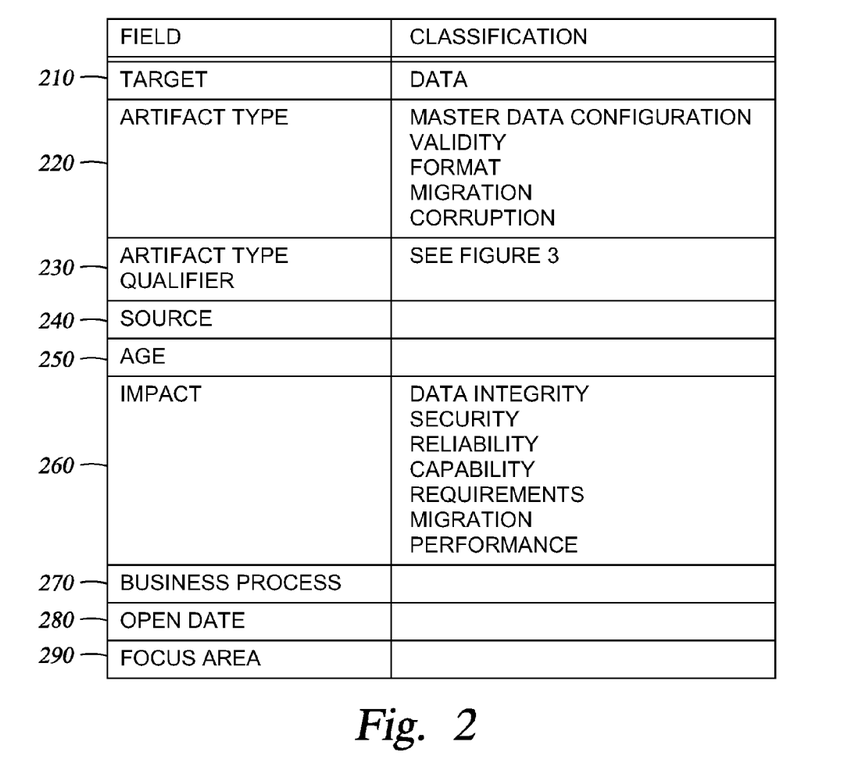
FIG. 2 illustrates exemplary fields of a data structure configured to retain defect data, according to an embodiment of the invention.

FIG. 2 illustrates an exemplary arrangement of data structure 200 for storing information related to data defects. As illustrated, each entry in data structure 200 may include a plurality of fields for classifying a defect. For example data structure 200 may include a TARGET field 210 for identifying a class of the defect. Defect classes may include, for example, code defects, environment related defects, data defects, and the like. Because data structure 200 illustrates the classification of data defects, the further classification options shown in data structure 200 are related to data defects. For other classes of defects the same or different classification options may be provided.

Data structure 200 may include an ARTIFACT TYPE field 220 to further describe a data defect. Exemplary artifact type descriptions of data defects may include, for example, master data configuration defects, validity defects, format defects, data migration defects, data corruption defects, and the like, as shown in field 220 FIG. 2. A data defect may be described by any one of the artifact types listed above.

Master data configuration defects may result from data associated with a software product being improperly interlocked, coordinated, or otherwise set up. Therefore, data may be added or deleted to a system executing the software product to resolve the defect. For example, the software product may be configured to access a particular database. If the database is not set up and available to the software product, or if the data is corrupted, a master data configuration type data defect may occur.

Validity type data defects may occur due to the use of expired, withdrawn, or otherwise incorrectly used data. For example, the software system may access data that is 'old' and no longer valid. This may occur, for example, if the data is altered and the altered data is not available to the software system. Therefore, the software product may access an older version of the data. Validity type data defects may be resolved by making the proper data available to the software system executing the software product.

Format type data defects may arise from the use of an incorrect data format such as, for example, an incorrect date format, character length, character type, and the like. For example, the software product may be configured to prompt a user for a numerical value. However, the software product may be configured to accept only integer type numerical values. If a decimal type data value is entered, the software product may receive incorrect data.

Migration type data defects may occur if data is not migrated correctly, for example, due to a problem with data mapping. Such data defects may be resolved by properly mapping and remigrating data. For example, a software product may be configured to link with a database to retrieve data therefrom. Migration type data defects may occur if an incorrect link is provided, thereby making the database unavailable to the software product. In contrast, Master Data Configuration data defects may occur if the data itself is corrupted.

Corruption type data defects may occur due to unintended changes made to data. For example, an individual data record, or group of data records may be overlaid with another set of data due to some software, logic, or hardware failure. Therefore, the original data must be made available to the software product in order for the software product to function properly.

Figure 3:
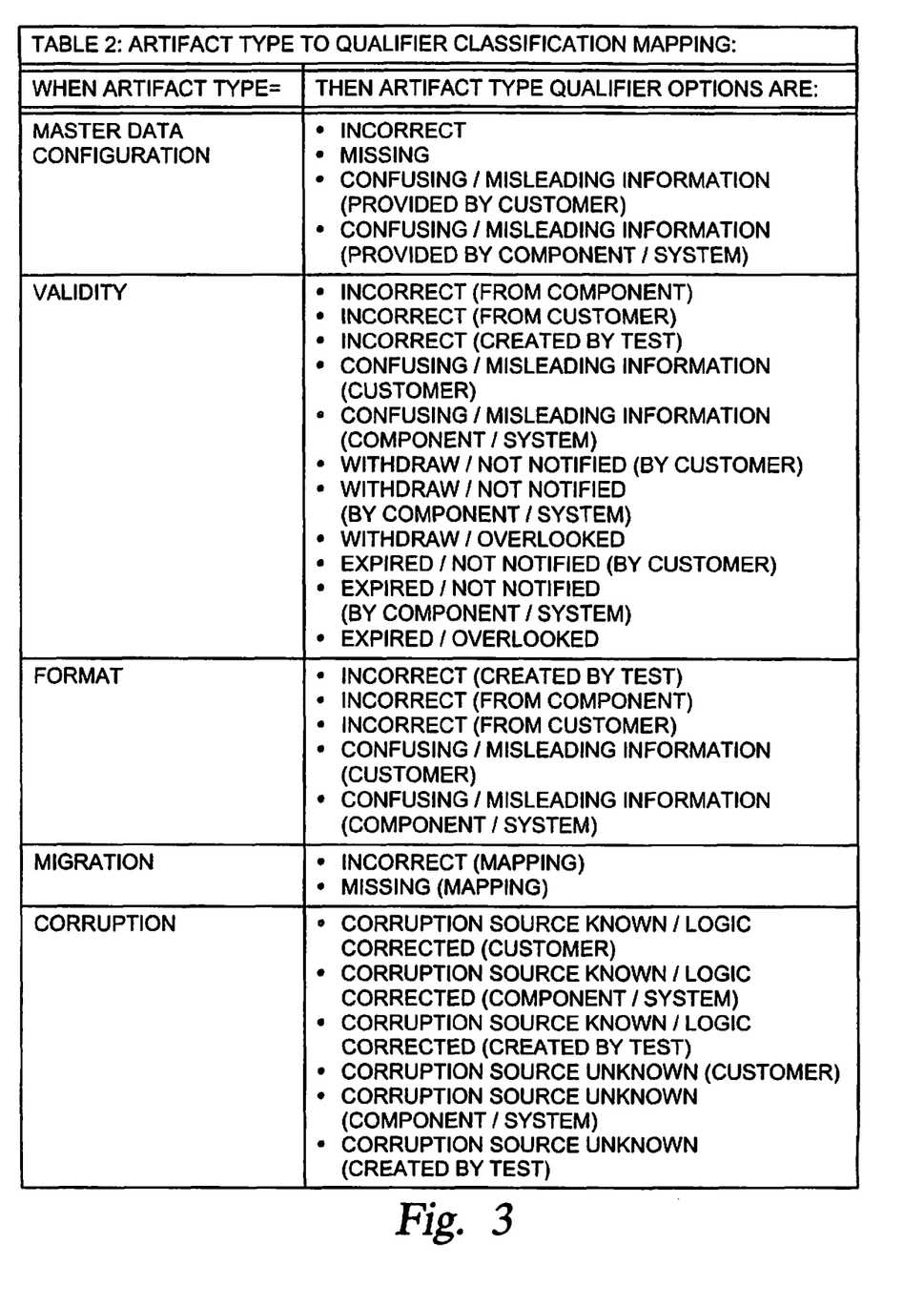
FIG. 3 illustrates exemplary artifact types and artifact type qualifiers according to an embodiment of the invention.

Data structure 200 may also include an ARTIFACT TYPE QUALIFIER field to further describe a particular artifact type identified in the artifact type field 220. FIG. 3 illustrates exemplary artifact type qualifiers for the artifact types shown in field 220 of FIG. 2. For example, the artifact type qualifiers for master data configuration type defects may include data defects arising from incorrect data, missing data, confusing or misleading data provided by a customer, confusing or misleading data provided by the system or a component, and the like.

Artifact type qualifiers for validity type data defects may include data defects arising due to incorrect data, confusing/misleading information, withdrawn data, expired data, and the like. Each of the categories may be further classified based on a source of the error, for example, a component, customer, system, and the like, as illustrated in FIG. 3.

Artifact type qualifiers for format type data defects may include data defects arising from incorrect data, confusing or misleading data, and the like. Each of these categories may be further classified based on a source of the error, for example, a customer, component, system, or errors created by the test, as illustrated in FIG. 3. Migration type data defects may be classified as defects arising from incorrect mapping of data, missing mapping of data, and the like, as illustrated in FIG. 3.

Artifact type qualifiers for corruption type data defects may be classified based on knowledge of the source of corruption and whether a correction was made to prevent the source of corruption. Corruption sources may include, for example, customers, system, component, and errors created by test, as illustrated in FIG. 3.

Referring back to FIG. 2, data structure 120 may include a source field 240 and an age field 250. Source field 240 may identify a particular source of an error, for example, a component or application to which a defect may be attributed. Age field 250 may describe a time characteristic of the defect, for example, 'old', and 'new'. For example, a defect may be a recurring defect that has continued to occur over an extended period of time. Such defects may be classified as 'old defects'. In one embodiment of the invention, source field 240 and age field 250 may be inapplicable to data defects, and therefore, may be left blank.

Data structure 120 may also include an impact field 260. Impact field 260 may identify a characteristic of the software product that may be affected as a result of the defect. For example, impacted areas may include data integrity, security, reliability, capability, requirements, migration, performance, and the like, as illustrated in FIG. 2.

In one embodiment, data structure 120 may include a business process field 270. Business process field 270 may identify business process or function level assessment information. For example, business process field 270 may identify a particular task during which the error was detected. In one embodiment of the invention, the business process field 270 may be optional, and therefore, an entry may not be necessary to describe the defect. Data structure 120 may also include an open date field 280. Open date field 280 may indicate the date on which a defect was detected.

Data structure 120 may further include a focus area field 290. Focus area field 290 may identify a particular area in which improvements to the software development process may be made to obviate the occurrence of defects. In one embodiment of the invention focus area field 290 may be calculated based on the input in one or more of fields 210-280. Exemplary focus areas may include Skills/Training/Process, communication, components/system, and customers, as illustrated in FIG. 4.

Each identified focus area may include a further description a particular aspect of the focus area affected by the defect. For example, referring to FIG. 4, Skills/Training/Process may require improvements to avoid data defects resulting from one of incorrect, missing, expired/overlooked, withdrawn/overlooked data, and the like. Communications may be improved to properly communicate information regarding one of expired and withdrawn data between any one of customers, components, the system, etc., as illustrated in FIG. 4.

Figure 4:
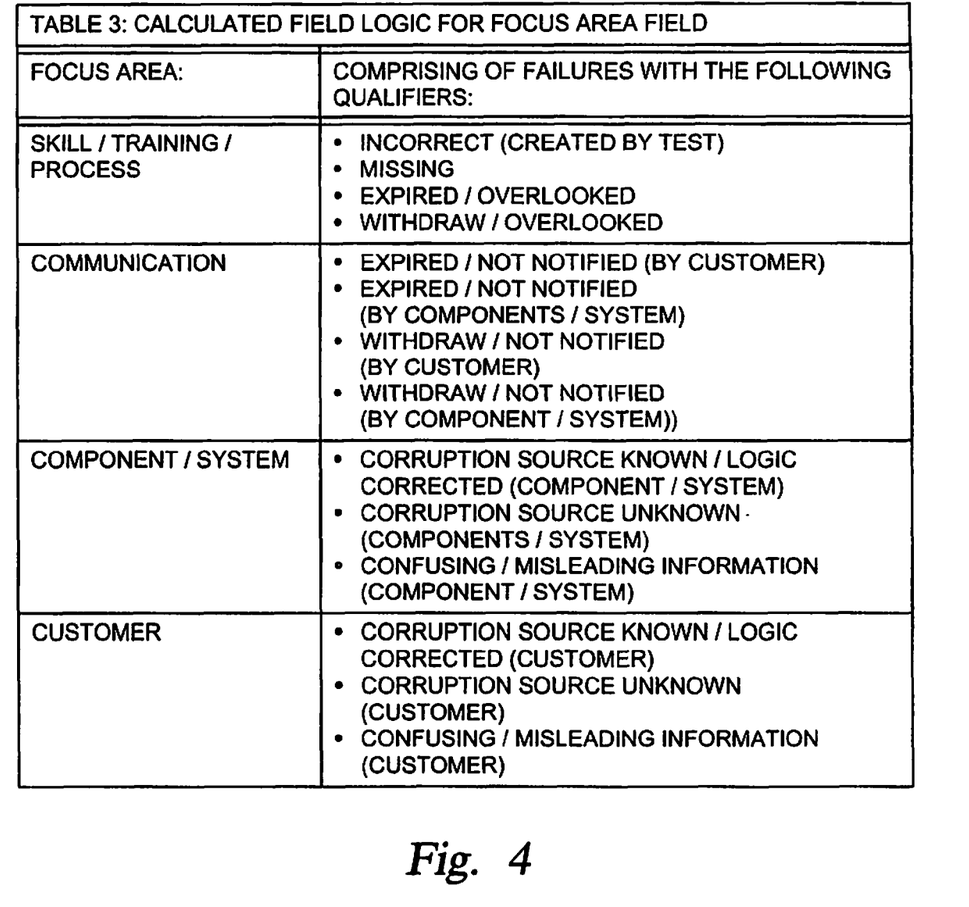
FIG. 4 illustrates exemplary focus areas according to an embodiment of the invention.

The component/System focus area may require improvements to avoid data defects arising known corruption sources, unknown corruption sources, and confusing or misleading information provided by a component/system, as illustrated in FIG. 4. The customer focus area may require improvements to avoid data defects arising known corruption sources, unknown corruption sources, and confusing or misleading information provided by a customer, as illustrated in FIG. 4.

One skilled in the art will recognize that the particular artifact types 220 and impact areas 260 illustrated in FIG. 2, artifact type qualifiers illustrated in FIG. 3, and focus areas illustrated in FIG. 4 for data defects are not limiting on the invention. Rather, any reasonable classification of data defects may be utilized based on a particular nature of a software product. Generally, any reasonable classification of artifact types, artifact type qualifiers, impact areas, and focus areas, fall within the purview of the invention.

In one embodiment of the invention, a person storing defect data into data structure 120 may launch a defect data collection tool 112 to enter defect data. The defect data collection tool may display one or more graphical user interface screens configured to receive defect data. For example, a graphical user interface screen may provide drop down boxes, text areas, check boxes, and the like, to allow a user to select a particular defect class, artifact type, artifact type qualifiers, impact areas and the like.

Defect Analysis

As previously discussed, data related to each defect and the resolution of each defect may be stored in data structure 120. The defect data in data structure 120 may be analyzed to determine problem areas in the software and/or the software development process. Crucial data derived from the defect analysis may include, for example, readiness to move to a next phase of development, an impact of the defects, customer satisfaction, need for additional training of personnel, need for additional components/functionality, and the like. By deriving such crucial data from the analysis of defects, strategic decisions may be made to devote appropriate resources to reduce future defects and identify, predict, and mitigate risks associated with a software product.

Referring back to FIG. 1, computer 131 may include a defect analysis tool 132 for analyzing the defect data stored in data structure 120. For example, defect analysis tool 132 may be configured to compile the data stored in data structure 120 and generate graphs, pie charts, and other representations of the characteristics of defects stored in data structure 120. The representations may indicate, for example, one or more problem areas associated with a software product. While the defect analysis tool is shown in computer 131, one skilled in the art will recognize that defect analysis tool 132 may be contained in any computer containing or having access to data structure 120. For example, the defect analysis tool may be contained in a computer operated by a manager of a software development project. The manager may use the defect analysis tool 120 to devise strategies to improve quality, reliability, etc. of a software product.

Figure 5:
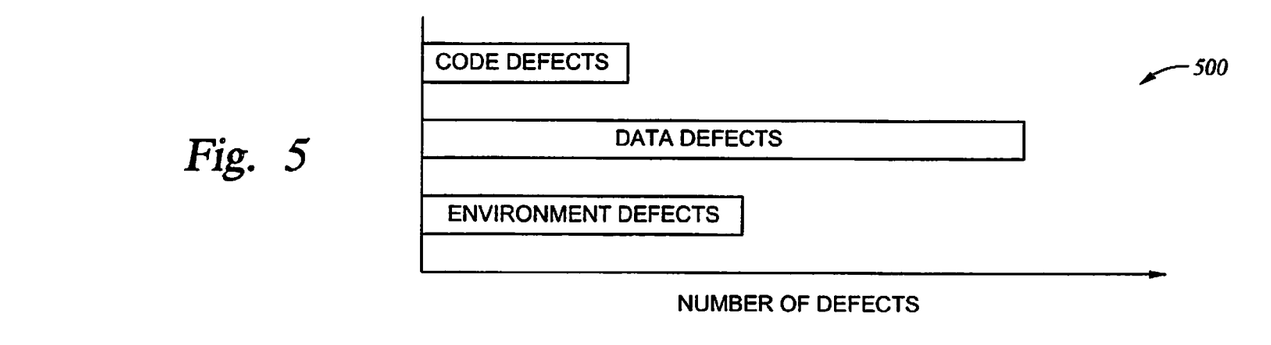
FIG. 5 illustrates an exemplary bar graph generated to analyze defects according to an embodiment of the invention.

The analysis of defects may begin by determining a dominant class of defects. As previously discussed, defect classes may include, for example, code defects, environment defects, data defects, and the like. A class of defects may be determined to be the dominant class of defects if a majority of defects fall within the class. For example, FIG. 5 illustrates a bar graph 500 representing the different classes of defects. As illustrated in FIG. 5, each bar in bar graph 500 may indicate the number of defects in a particular class of defects. For example, in FIG. 5, data defects are the dominant class because data defects represent a majority of the defects as indicated by the relative lengths of the bars. The dominant class of defects may determine a particular analysis path for analyzing the defects. This section addresses the analysis path that may be followed for data defects.

Data defects may be generally be associated with data dependencies and functionality of a system executing a software product. Analysis of data defects may provide an indication of the costs that may be incurred to cure the occurrence of defects, effect of defects on the project schedule, test effectiveness, and the like. Data defects may be caused by a variety of reasons including, but not limited to, data creation and/or data configuration processes and procedures, level of skill or training of customers and personnel developing the software product, interaction between the software product and customers and/or a component or system, communication across a system components or applications, and the like.

Analysis of data defects may be performed at various stages in a software development project. For example, data defect analysis may be performed to determine an interim progress/risk assessment, a phase exit risk assessment, and future improvements of a software product. Interim progress/risk assessment may be performed at any time during development, but prior to completion of the software development project. Phase exit risk analysis may be performed at the completion of a particular phase/task, or when a predetermined milestone is reached, to determine a risk of moving forward with development. Phase exit risk may also indicate whether measures taken to correct defects during a particular phase were effective. Interim progress/risk assessment and phase exit risk analysis may generally determine particular problem areas to which resources may be devoted to more effectively and efficiently complete the software development project while maintaining quality and reliability.

Future improvement analysis may be performed to determine improvements for future versions of a software product. For example, a first version of a software product may be developed and marketed. A future improvement analysis may be performed on the first version to determine improvements for a second version of the software product.

Focus Area Analysis

In one embodiment of the invention, analysis of data defects may begin by performing a focus area analysis of the data defects. The focus area analysis of data defects may be performed based on one or more criteria. For example, the focus area analysis may be performed for each failing component, by open data of the defects, by business process, and the like.

Figure 6:
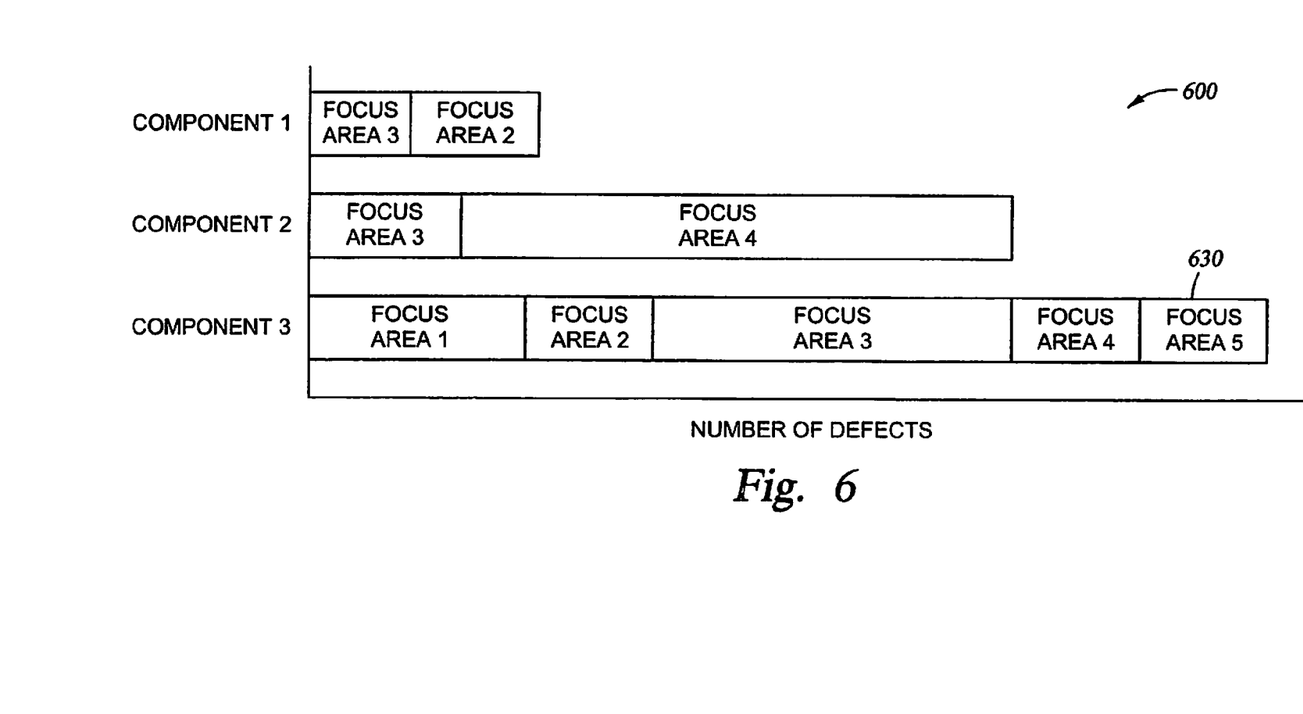
FIG. 6 illustrates an exemplary bar graph generated during focus area analysis, according to an embodiment of the invention.

FIG. 6 illustrates an exemplary visual representation 600 generated by defect analysis tool 132 for analyzing focus areas by failing components. As illustrated in FIG. 6, visual representation 600 may be a bar graph showing the number of defects for each component of a software system. The length of each bar representing a particular component may indicate the total number of defects encountered for that component.

Furthermore, each bar may also display the specific focus area affected by the defects for a component. For example, bar 630 illustrates the defects for component 3 in FIG. 6. As illustrated bar 630 is divided into one or more focus areas. The length of the bar devoted to each focus area may be proportional to the number of defects associated with the focus area. For example, the majority of defects associated with component 3 may be associated with focus area 3. On the other hand relatively few errors associated with component 3 may affect focus area 2. Accordingly, the greatest area/length of the bar is devoted to focus area 3, and a relatively smaller area/length of the bar is devoted to focus area 2.

Similar charts may be generated to identify dominant focus areas for business processes, open dates, and the like. By identifying the dominant focus areas for each component, for example, corrective actions may appropriately be taken to obviate errors associated with the component. For example, because focus area 3 is the dominant focus area for component 3 in FIG. 5, corrective actions may be taken to avoid defects affecting focus area 3 in component 3.

In one embodiment of the invention, a predetermined plan of action may exist to cure defects associated with a particular focus area. In one embodiment, the predetermined plan of action may be generated by a computer and displayed to a user, for example, a manager of the software development project.

Referring back to FIG. 4, exemplary focus areas may include Skill/Training/Process, Communication, Component/System, and Customer. If the dominant focus area is Skills/Training/Process, defects are likely occurring due to inexperience, lack of skill, or knowledge on the part of a user or tester of the software product. Potential solutions for this focus area may include instituting training programs to improve the level of skill and knowledge of users. Addressing skills/training may require a static solution with an ongoing focus in order to be effective. For example, repeated training sessions may be required for new personnel as they join the organization developing the product.

In one embodiment, defects associated with skills/training/process may be used to identify process changes, which may obviate the need for repeated training. For example, a focus area bar graph may be generated by business process. By identifying dominant focus areas affected by defects for each business process, process changes may be instituted to obviate occurrence of the errors. For example, a process having many defects may be removed, replaced, or repaired to remove the defects. Based on the information derived from the focus area analysis, an organization may select any optimal balance between training and process adjustment to resolve defects.

The predetermined plan for resolving defects for each focus area may depend on the stage of development during which the analysis is performed. For example, if skills/training/process is a dominant focus area during an interim progress/risk analysis, the analysis may provide indications for corrective measures that may be implemented to mitigate the occurrence and effect of the defects. Therefore, the predetermined plan may involve corrective measures such as training personnel.

If skills/training/process is the dominant focus area in a phase exit risk analysis, the analysis may indicate the effectiveness of defect resolution during the completed phase. For example, phase exit risk analysis may indicate the effectiveness of a training program in resolving defects. Therefore, training strategies may be adjusted based on the phase exit risk analysis.

If skills/training/process is the dominant focus area in a future development analysis, the analysis may indicate changes that may be made to obviate defects in a future product. For example, future development analysis may indicate a pervasive defect occurring, for example, during a particular process. Therefore, the particular process may be automated in a next release of the product to obviate errors caused due to lack of skill.

If the dominant focus area is communication, defects may be occurring due to improper documentation or communication of database contents, data structures, data formats, and the like. If communication is found to be a dominant focus area during an interim progress/risk analysis, then it may indicate a detrimental effect on productivity and ineffectiveness of testing. One solution to avoid communication problems may be to investigate patterns and trends of the communication related defects on components and/or discuss the defects with customers or management to improve communication procedures If communication is the dominant focus area during a phase exit risk analysis, it may indicate that communication deficiencies were not adequately addressed on a timely basis as they arose, thereby indicating ineffectiveness of testing. In one embodiment, in addition to the analysis of the number of defects, the trend of the defects over time may also be analyzed to determine problems that were pervasive throughout a phase of the project, or that were identified at a particular time during the phase. Pervasive problems may indicate that the testing of the product was not effective. Therefore, measures to improve communication may be adjusted accordingly to prevent defects. The trends over time analysis is discussed in greater detail below.

If communication is the dominant focus area during future improvement testing, discussions may be held between owners of components and applications and/or customers to improve communication procedures.

If component/system is the dominant focus area, defects may be arising due to a defective component or application, a group of defective components or applications, or the system itself. In other words, the functionality of the product may not be the problem, but rather the problem may arise from a deficiency in one or more components, applications or the system.

There may be two general causes for data defects caused due to defective components, applications, the system, and the like. A first cause of the defects may be related to data with incorrect or missing elements being delivered by a component/system. Such data defects may result in increased cost to correct the defective components, schedule delays, and ineffective testing.

If component/system is the dominant focus area during interim progress/risk assessment, resolving defects may involve negotiating remedial actions with parties responsible for affected components/system causing the defects. If the component/system is the dominant focus area during phase exit risk analysis, this may indicate that remedial measures taken during the phase were ineffective. Similarly, future improvement analysis may indicate the effectiveness of remedial measures. Therefore, appropriate further remedial measures may be taken to reduce defects in future phases and products.

A second cause for component/system related defects may be improper overlaying or corruption of data due to flawed software logic or hardware failure, for example. If sufficient diagnostic capability is available to determine the cause of bad data, testing may be interrupted at least until the data is fixed. In one embodiment of the invention, fixing the bad data may be made a high priority task. If, however, the diagnostic capability is not available, the frequency of occurrence of the defects may be determined. If the frequency of errors is determined to be excessive, this may indicate a likely negative outlook for customer satisfaction. Therefore, development may be stopped until the defect is resolved.

If customer is the dominant focus area, date defects may be arising from bad data provided by the customer. Resolving defects arising from the customer may be resolved by notifying the customer and negotiating remedial actions at the earliest possible time to avoid increased costs, schedule delays, and the like.

Artifact Analysis

Figure 7:
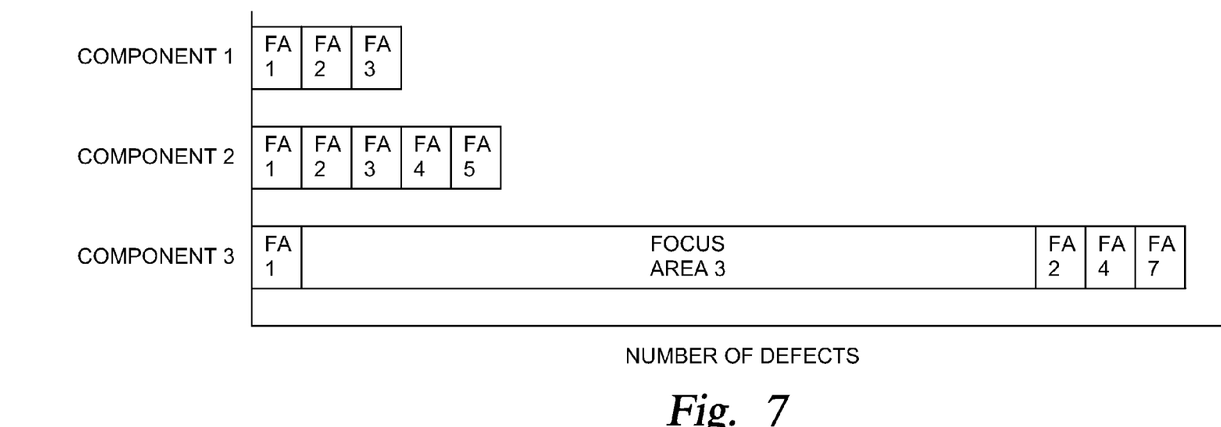
FIG. 7 illustrates another exemplary bar graph generated during focus area analysis, according to an embodiment of the invention.

In one embodiment of the invention, if any one focus area dominates in a relatively few number of components or applications across the system, an artifact analysis may be performed on the components to determine corrective actions for resolving defects. FIG. 7 illustrates a bar graph showing a single focus area dominating a few components. For example, as illustrated, components 1 and 2 have relatively a few number of defects. On the other hand, component 3 has a large number of defects, as indicated by the relative lengths of the bars. Furthermore, a large portion of the errors caused in component 3 are associated with focus area 3. Therefore, an artifact analysis may be performed for component 3 to identify corrective measures.

Referring back to FIG. 3, exemplary artifact types may include, for example, master data configuration, validity, format, migration, corruption and the like. An artifact type qualifier may further describe each artifact type, as illustrated in FIG. 3. In one embodiment of the invention, an artifact type by artifact type qualifier chart may be generated during artifact analysis.

Figure 8:
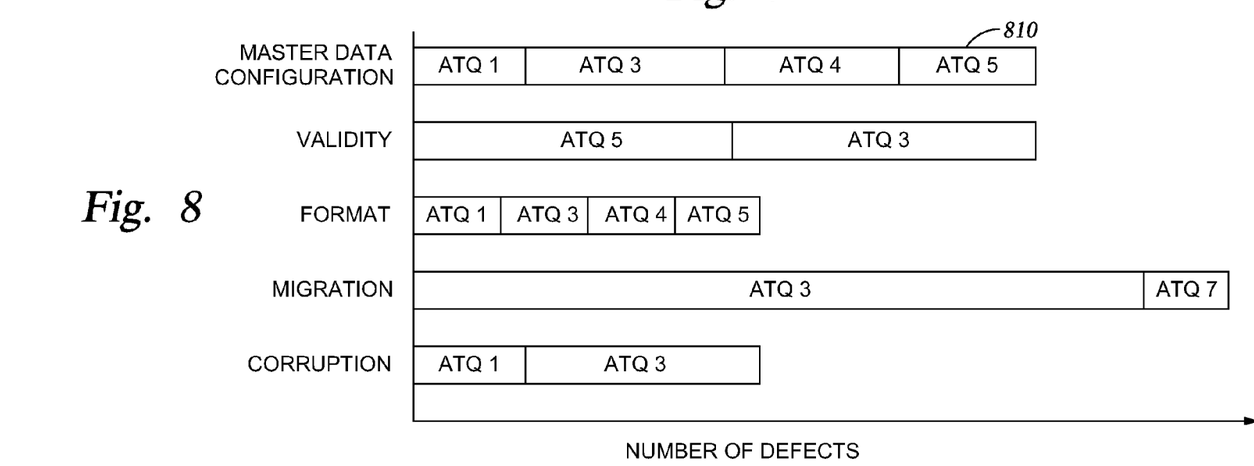
FIG. 8 illustrates an exemplary bar graph generated during artifact analysis, according to an embodiment of the invention.

FIG. 8 illustrates an exemplary artifact type by artifact type qualifier chart. As illustrated in FIG. 8, the length of the bar for each artifact type may indicate the number of defects associated with the artifact type. Furthermore, each bar may also indicate the number of defects associated with each artifact type qualifier associated with the artifact type. The artifact type qualifiers may be, for example, the artifact type qualifiers listed in FIG. 3. For example, the master data configuration bar 810 indicates the number of errors associated with Artifact Type Qualifier (ATQ1), ATQ2, ATQ3, and ATQ4. In one embodiment, ATQL may represent defects caused due to incorrect data, ATQ2 may represent defects associated with missing data, ATQ3 may be associated with confusing/misleading information provided by the customer, and ATQ4 may be associated with confusing/misleading data provided by a component or system (See FIG. 3).

In one embodiment of the invention, if a significant proportion of master data configuration related defects are attributable to incorrect data or missing data, then the defects may be caused due to weaknesses in skills/training or process. Accordingly, a predetermined plan associated with the skills/training/process focus area described in the previous section may be implemented.

In one embodiment of the invention, if a significant proportion of master data configuration related defects are attributable to confusing or misleading data provided by a customer, a predetermined plan associated with the customer focus area described in the previous section may be implemented. If a significant proportion of master data configuration related defects are attributable to confusing or misleading data provided by a system or component, a predetermined plan associated with the system/component focus area described in the previous section may be implemented In one embodiment of the invention, if a significant portion of validity related data defects are attributable to incorrect data, withdrawn data or expired data, the defects may be determined to be emanating from deficiencies in skill/training or process. Accordingly, a predetermined plan associated with the skills/training/process focus area described in the previous section may be implemented.

In one embodiment of the invention, if a significant portion of validity related data defects are attributable to incorrect data created by test, withdrawn but overlooked data or expired but overlooked data, the defects may be determined to be emanating from deficiencies in skill/training or process. Accordingly, a predetermined plan associated with the skills/training/process focus area described in the previous section may be implemented.

In one embodiment of the invention, if a significant portion of validity related data defects are attributable to withdrawn data, but not notified by customer and expired data but not notified by customer, the defects may be determined to be emanating from improper communication with the customer. Accordingly, a predetermined plan associated with the communication with customer focus area described in the previous section may be implemented.

In one embodiment of the invention, if a significant portion of validity related data defects are attributable to withdrawn data, but not notified by component/system and expired data but not notified by component/system, the defects may be determined to be emanating from improper communication between components/system. Accordingly, a predetermined plan associated with the communication with component/system focus area described in the previous section may be implemented.

In one embodiment of the invention, if a significant portion of validity related data defects are attributable to data that is incorrect when received from the customer or data that is confusing or misleading when received from the customer, the defects may be determined to be emanating from the customer. Accordingly, a predetermined plan associated with the customer focus area described in the previous section may be implemented.

In one embodiment of the invention, if a significant portion of validity related data defects are attributable to data that is incorrect when received from a component/system or data that is confusing or misleading when received from a component/system, the defects may be determined to be emanating from the component or system. Accordingly, a predetermined plan associated with the Component/System focus area described in the previous section may be implemented.

In one embodiment of the invention, if a significant portion of format related data defects are attributable to incorrect data created by test, the defects may be emanating from weaknesses in skill/training or process. Accordingly, a predetermined plan associated with the skills/training/process focus area described in the previous section may be implemented.

In one embodiment of the invention, if a significant portion of format related data defects are attributable to confusing or misleading information from a customer or incorrect data received from a customer, the defects may be emanating from the customer. Accordingly, a predetermined plan associated with the customer focus area described in the previous section may be implemented.

In one embodiment of the invention, if a significant portion of format related data defects are attributable to confusing or misleading information from a customer or incorrect data received from a component/system, the defects may be determined to be emanating from the component/system. Accordingly, a predetermined plan associated with the component/system focus area described in the previous section may be implemented.

In one embodiment of the invention, if a significant portion of migration related data defects are attributable to incorrectly mapped or missing (mapping) data, the defects may be determined to be emanating from weaknesses in skills/training or process. Accordingly, a predetermined plan associated with the skills/training/process focus area described in the previous section may be implemented.

In one embodiment of the invention, if a significant portion of corruption related data defects are attributable to source of corruption known and logic corrected for data provided by customer, source of corruption known and logic corrected for data provided by component/system, and source of corruption known and logic corrected for data created by test, then the defects may have been corrected and further occurrences of the defects may have been prevented. Therefore, the analysis may be provided to a customer, component/system, or test management for their records.

In one embodiment of the invention, if a significant portion of corruption related data defects are attributable to source of corruption unknown for data provided by customer, source of corruption unknown for data provided by component/system, and source of corruption unknown for data created by test, then the defects may be likely to occur again. Therefore, the analysis may be provided to a customer, component/system, or test management so that alternative remedies may be sought.

In one embodiment of the invention, if all the components or applications of the system display the same trends, an artifact type by focus area analysis may be performed to determine corrective actions. Nothing to be added here.

Trends Over Time Assessment

In one embodiment of the invention, the trends of defects over time may be analyzed. For example, corrective measures taken to resolve defects may terminate the defect causing condition, therefore, resulting in no more defects of a particular type occurring. Accordingly, the trends over time assessment of defects may facilitate more accurate focusing of resources to actual problem areas rather than devoting resources to already resolved problems.

In one embodiment of the invention, a target by open date analysis may be performed to determine the trends of a particular target over a period of time. Targets may include, for example, data defects, environment defects, code defects, and the like.

Figure 9A:
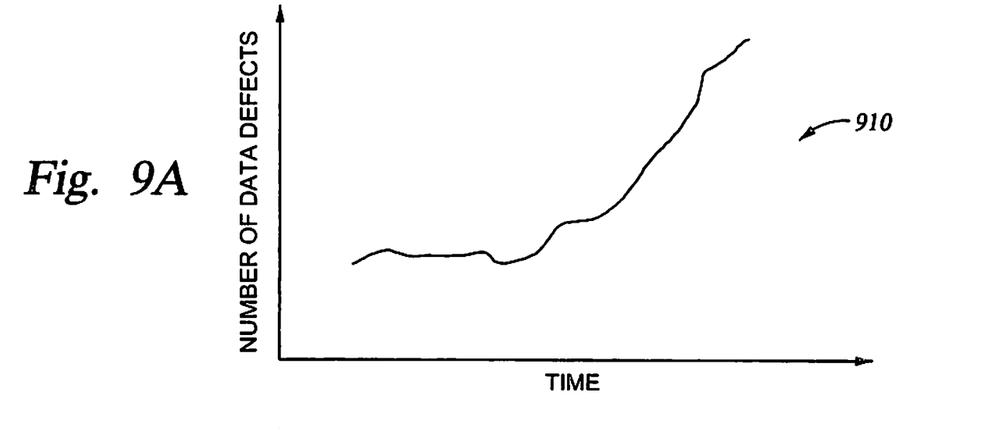
FIG. 9 illustrates exemplary graphs generated during trends over time analysis, according to an embodiment of the invention.
Figure 9B:
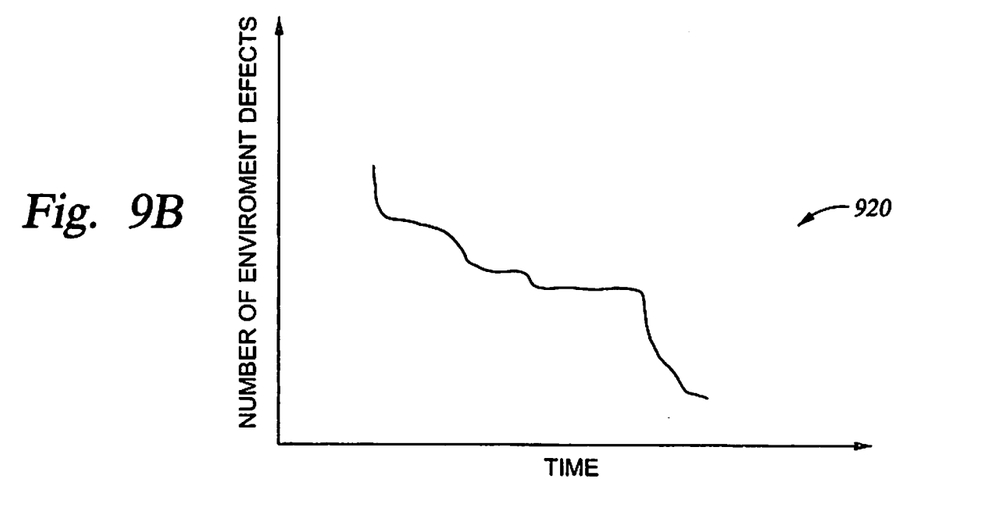
Figure 9C:
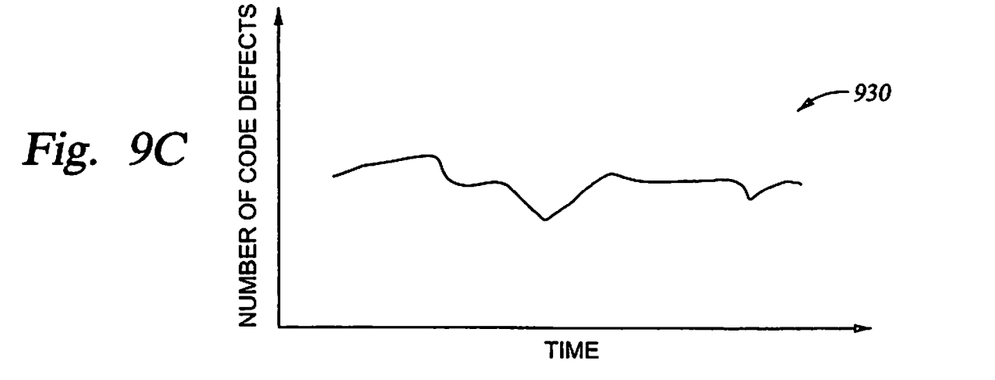

In one embodiment of the invention the target by open data analysis may be performed to determine a particular target area for devoting resources for defect resolution. FIG. 9 illustrates exemplary charts illustrating the trends over time for three target areas, namely, data defects, environment defects, and code defects. As illustrated in FIG. 9, data defects chart 910 shows an increasing number of data defects over time, environment defects chart 920 shows a decreasing trend of defects over time, and code defects chart 930 shows a relatively stable number of defects over time.

If the number of defects does not decrease over time, it may indicate a need for further analysis to identify problem areas. Accordingly an analysis path for a particular target area may be selected based on the trends over time analysis for a particular target area. For example, referring to FIG. 9, a more detailed analysis may be necessary for data defects and code defects because the number of defects does not decrease over time for those target areas.

In one embodiment, the trends over time analysis may be performed during either one of interim progress and risk assessment or phase exit risk assessment. For example, in one embodiment, if the trend of data defects does not decrease over time during interim progress and risk assessment, it may indicate the level of risk to a project schedule, effectiveness of testing, and/or corrective actions necessary to reduce data failures. In one embodiment, if the trend of data defects does not decrease over time during phase exit risk assessment, it may indicate the level of risk that adversely impacted effectiveness of testing.

Furthermore, if a testing environment closely mirrors production environment, the occurrence of data defects may be likely to occur during production if not specifically addressed. Therefore, corrective actions may be necessary to resolve the data defects.

In one embodiment, if the data defects do not decrease over time, further analysis of the data defects may include determining trends of data defects over time for each component or application. The trends of data defects over time for each component may be performed to determine whether defects associated with each component or applications are pervasive over time. Pervasive or increasing defects for a particular component or application may indicate that the component or application is the source of the defect.

Once a particular component or application has been identified as error prone, assessments of artifact type and qualifier for the component may indicate the specific nature of the problem associated with the component or application. Corrective measures may therefore be taken according to the specific deficiencies in the component or application. One skilled in the art will recognize that the trends over time analysis of data defects for each component may be performed during interim progress and risk assessment or during phase exit risk assessment.

In one embodiment of the invention, trends over time analysis may include a trigger by open date analysis. Triggers may be specific conditions present during testing of a software product, for example, simple triggers, such as Coverage and Variation typically arise earlier in a test phase. In contrast, the more complex triggers, such as dynamic interaction among various functions, can only be exercised later in the test after the system has stabilized in a basic way.

Trigger failures that originate due to data issues and persist or increase over time during testing may indicate a risk of additional costs, delays to the schedule, and the like. Furthermore, data trigger analysis may also indicate the robustness of testing. For example, during interim progress and risk assessment, a majority of simple trigger failures may arise earlier in a test phase. The simple trigger failures may be resolved and subsequent trigger failures may be complex trigger failures. This may indicate a system that stabilized in a basic way early during testing, allowing the test team to exercise the system in a much more robust fashion. In other words, trigger analysis may determine whether system complexity affects the occurrence of data defects.

Trends over time analysis for data triggers during phase exit risk assessment may indicate the likelihood of data defects related to a particular trigger occurring during production. Generally, three types of trends may be investigated during phase exit risk assessment. A first trend may show the volume of defects for all triggers decreasing over time by the last period/phase preceding the phase exit assessment. This may indicate effective resolution of the data defects.

A second trend may show a majority of simple trigger related defects surfacing early in the test phase, and movement towards more complex triggers later. This may indicate that the system stabilized in a basic way early in the test phase, thereby allowing the test team to exercise the system in a more robust fashion as the testing continued. Therefore, the second trend may indicate whether system complexity is related to the occurrence of data defects. A third trend may show an absence of activity for a particular trigger, thereby indicating that testing did not involve the particular trigger, or if testing was performed, it was ineffective. Because there are triggers specifically associated with certain activities, a trend indicating that all triggers have been utilized to some extent would be investigated.

More generally, if more defects than expected are seen for a particular trigger, it may indicate that the system or a component of the system has a weakness. If the number of defects over time for the problematic trigger do not decrease over time, corrective measures may be necessary to correct the defects arising from the trigger.

In one embodiment of the invention, trends over time analysis for data defects may include an impact by open date analysis. The trends over time analysis for impact areas, for example, impact areas shown in field 260 of FIG. 2, may allow focusing of efforts to improve the software product to that particular impacted area.

For example, pervasive or increasing data defects impacting reliability indicate the data defects may result in catastrophic effects on the system. Pervasive or increasing data defects impacting capability may indicate basic system functions are affected. Pervasive or increasing data defects impacting security may indicate that malicious or inadvertent accesses to protected data may be possible. Pervasive or increasing data defects impacting data integrity may indicate that improper overlaying or corruption of data may be occurring. Pervasive or increasing data defects impacting migration may indicate that a customer is hampered from properly migrating data due to structure or formatting. Pervasive or increasing data defects impacting performance may indicate the a system or components ability to process data within specification is affected.

In one embodiment of the invention, pervasive or increasing data defects related to reliability, data integrity, and/or security in a test environment that closely mirrors the production environment may indicate fundamental system instabilities that may lead to poor customer satisfaction. Therefore, during phase exit assessment a determination may be made about the seriousness of the problems, mitigation actions that must be taken, and whether movement to the next phase is feasible.

System Stability Assessment

In one embodiment of the invention, a system stability analysis may be performed to determine, for example, a focus area and associated actions, a risk of moving forward to a next phase, improvements for a future product, and the like. For example, system stability analysis may include an artifact type by severity assessment. Severity may be a field associated with data structure 120 shown in FIG. 2, and may be entered for each defect by a person entering defect data when the defect is detected or resolved.

For high frequency artifact types, severity may be used to prioritize focus areas and associated actions. For example, the severity analysis may disclose data defects of greater significance, thereby allowing focusing of efforts to resolve the data defects of greater significance. Such focusing of efforts may allow, for example, cost of resolving defects to impact of resolving defects, thereby making resolution of defects more effective.

In one embodiment of the invention, an artifact type by impact analysis may be performed to determine system stability. For example, a large number of data defects impacting reliability indicate the data defects may result in catastrophic effects on the system. A large number of data defects impacting capability may indicate basic system functions are affected. A large number of data defects impacting security may indicate that malicious or inadvertent accesses to protected data may be possible. A large number of data defects impacting data integrity may indicate that improper overlaying or corruption of data may be occurring. A large number of data defects impacting migration may indicate that a customer is hampered from properly migrating data due to structure or formatting. A large number of data defects impacting performance may indicate the a system or components ability to process data within specification is affected.

In one embodiment of the invention, system stability analysis may involve performing an artifact type by trigger analysis. The artifact type by trigger analysis may be performed to understand the nature of data defects as they relate to increasing complexity in the nature of tests being performed. If the simplest system function triggers cluster in relatively high frequencies, the overall system design, in terms of code or data, may not be stable or well understood, interlocked, or executed. If the more complex triggers cluster in relatively high frequencies, it may indicate that the system is stable from a basic perspective, but there may be deficiencies in terms of skills/training, component diagnostic capability, recoverability or usability, and/or communication across components with regard to complex and advanced systems.

When artifact type by trigger analysis is performed, the maturity of the system, potential customer usage of certain features, and the likelihood of complex scenarios being encountered may factor into the corrective measures taken.

Data Preparedness Assessment

In one embodiment of the invention, data defect analysis may include performing a data preparedness assessment. Data preparedness assessment may involve performing, for example, an artifact type qualifier by component analysis. Data preparedness assessment may be performed to examine the distribution of artifact type qualifiers by failing component to identify problems associated with the access of data. For example, the 'query ease' issues associated with a particular data source may be examined.

If a predetermined artifact type qualifier dominates, either for a particular component or collectively for all components, then it may be likely that a data source could not be validated prior to the test. Artifact type qualifiers that show that a data source could not be validated include incorrect data created from test, incorrect data from component, incorrect data from customer, corruption source known and logic created (customer), corruption source known and logic corrected (component/system), corruption source known and logic corrected (created by test), corruption source unknown (customer), corruption source unknown (component/system), and corruption source unknown (created by test), for example.

During interim progress/risk analysis, dominant artifact type qualifiers may be discussed with component/system owners, customers, test management, and the like to correct the defects. The effectiveness of the corrective measures may be determined during phase exit risk.

Figure 10:
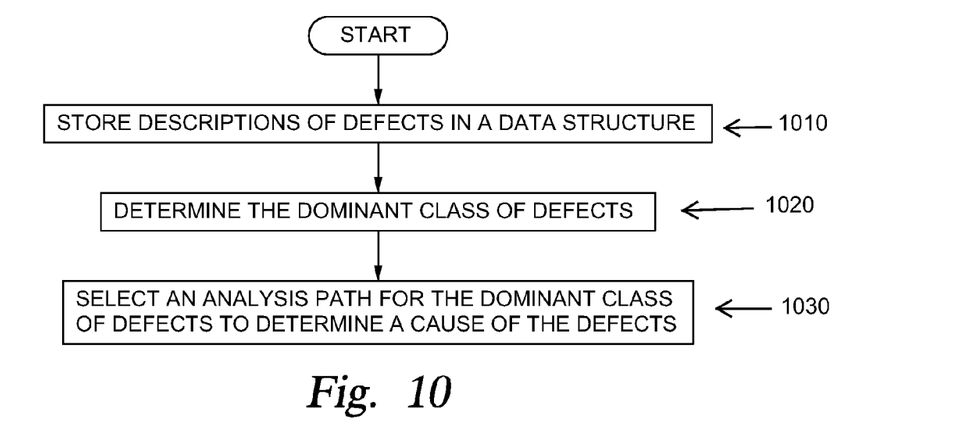
FIG. 10 is a flow diagram of exemplary operations performed during defect analysis, according to an embodiment of the invention.

FIG. 10 illustrates a flow diagram of exemplary operations performed for analyzing defects associated with a software product. The operations may begin in step 1010 by storing defect data in a data structure 120. For example, a tester or developer may enter data regarding a defect and resolution of the defect in data structure 120. In one embodiment, the defect may be classified as data defects. Further descriptions of the defect may also be entered, for example, artifact type, artifact type qualifier, impact area, open date, severity, and the like.

In step 1020, a defect analysis tool 132 may be used to determine a dominant class of defects. In step 1030, an analysis path for the dominant class of defects may be followed to determine a cause of the defects. For example, the analysis path for data defects may include performing, for example, focus area analysis, artifact analysis, trends over time analysis, system stability analysis and data preparedness analysis as discussed above. The analysis of data defects may be performed at various stages in during the project to determine for example, interim progress and risk, phase exit risk, future improvements, etc.

In one embodiment of the invention, data defect analysis described above may be configured to work in conjunction with orthogonal defect classification (ODC) analysis. In other words, the data defect classification and analysis may be integrated with ODC to enhance the ability of ODC to recognize data defects in addition to code defects, thereby allowing ODC to perform a more meaningful analysis of defects encountered during testing of a software product.

CONCLUSION

By allowing defects associated with data failures to be classified as data defects, embodiments of the invention facilitate better analysis of defects associated with a software development project. If data defects are determined to be the dominant class of defects encountered during testing, the data defects may be analyzed to determine a cause of one or more data defects. Therefore, corrective measures tailored to resolving the data defects may be taken.

While the foregoing is directed to embodiments of the present invention, other and further embodiments of the invention may be devised without departing from the basic scope thereof, and the scope thereof is determined by the claims that follow.

What is claimed is:

1. A method for analyzing defects associated with a software system comprising:
   identifying one or more defects during testing of a software product, wherein at least one defect is identified as a data defect;
   storing descriptions of the defects and resolution of the defects in a data structure; and
   analyzing the defects stored in the data structure to determine a cause for one or more of the defects, wherein analyzing the defects comprises:
      determining whether data defects dominate the defects; and
      if data defects dominate the defects, following an analysis path for data defects,
   wherein the analysis path for data defects determines a cause for one or more data defects, and wherein the analysis path for data defects comprises performing one or more of focus area analysis, artifact analysis, trends over time analysis, system stability analysis, and data preparedness analysis of the data defects.

2. The method of claim 1, wherein focus area analysis comprises determining a dominant focus area affected by the defects and determining a solution to resolve defects affecting the dominant focus area.

3. The method of claim 2, wherein the dominant focus area is one of
   skills, training, or process;
   communication;
   component or system; and
   customer.

4. A tangible computer readable storage medium comprising a defect analysis tool which, when executed, performs operations for analyzing defects associated with software systems, comprising:
   accessing a data structure comprising descriptions of defects identified during testing of a software product, wherein at least one of the defects is a data defect;
   determining whether the defects are predominantly data defects; and
   if data defects dominate the defects, analyzing the data defects to determine a cause for one or more data defects, wherein analyzing the data defects comprises performing one or more of focus area analysis, artifact analysis, trends over time analysis, system stability analysis, and data preparedness analysis of the data defects.

5. The tangible computer readable storage medium of claim 4, wherein focus area analysis comprises determining a dominant focus area associated with the defects and determining a solution to resolve defects associated with the dominant focus area.

6. A system, comprising:
   a memory device comprising:
      a defect data collection tool;
      a defect analysis tool; and
      a data structure coupled with the defect data collection tool and the defect analysis tool, wherein the data structure is configured to retain descriptions of defects identified during testing of a software system, wherein at least one of the defects is a data defect,
   wherein the defect analysis tool is configured to:
      access the data structure;
      determine whether data defects dominate the defects; and
      if data defects dominate the defects, analyze the data defects to determine a cause for one or more data defects, wherein the defect analysis tool is configured to analyze the data defects by performing one or more of focus area analysis, artifact analysis, trends over time analysis, system stability analysis, and data preparedness analysis of the data defects.

7. The system of claim 6, wherein focus area analysis comprises determining a dominant focus area associated with the defects and determining a solution to resolve defects associated with the dominant focus area.

8. The system of claim 6, wherein analysis of the defects is performed to determine one of an interim progress and risk assessment, a phase exit risk, and future improvements for the software system.

* * * * *